(12) United States Patent
Dupuis

(10) Patent No.: US 9,019,800 B2
(45) Date of Patent: Apr. 28, 2015

(54) SEALING DEVICE FOR A MINUTE-REPEATER

(71) Applicant: Montres Breguet S.A., L'Abbaye (CH)

(72) Inventor: Frederic Dupuis, La Chaux-de-Fonds (CH)

(73) Assignee: Montres Breguet S.A., L'Abbaye (CH)

( * ) Notice: Subject to any disclaimer, the term of this patent is extended or adjusted under 35 U.S.C. 154(b) by 75 days.

(21) Appl. No.: 13/862,788

(22) Filed: Apr. 15, 2013

(65) Prior Publication Data

US 2013/0279305 A1 Oct. 24, 2013

(30) Foreign Application Priority Data

Apr. 18, 2012 (EP) ..................... 12164533

(51) Int. Cl.

| | | |
|---|---|---|
| G04B 21/00 | (2006.01) | |
| F16J 15/02 | (2006.01) | |
| G04B 3/00 | (2006.01) | |
| G04B 21/14 | (2006.01) | |
| G04B 23/02 | (2006.01) | |
| G04B 37/08 | (2006.01) | |
| G04B 37/10 | (2006.01) | |

(52) U.S. Cl.
CPC ............... *G04B 21/00* (2013.01); *G04B 3/003* (2013.01); *G04B 21/14* (2013.01); *G04B 23/021* (2013.01); *G04B 37/08* (2013.01); *G04B 37/106* (2013.01); *F16J 15/02* (2013.01)

(58) Field of Classification Search
CPC .......... G04B 3/00; G04B 21/14; G04B 23/02; G04B 37/08; G04B 37/10

USPC ........... 368/75, 100, 243, 267, 269, 315, 319, 368/288–290; 277/628
See application file for complete search history.

(56) References Cited

U.S. PATENT DOCUMENTS

| 367,995 | A | * | 8/1887 | Morlet | 368/267 |
| 5,751,668 | A | * | 5/1998 | Eray | 368/290 |
| 2006/0291335 | A1 | | 12/2006 | Goeller et al. | |
| 2007/0280056 | A1 | | 12/2007 | Guyot | |
| 2008/0285390 | A1 | * | 11/2008 | Cretin et al. | 368/290 |
| 2011/0280111 | A1 | * | 11/2011 | Romano | 368/290 |

FOREIGN PATENT DOCUMENTS

| CH | 696 504 A5 | 7/2007 |
| EP | 0 443 086 A1 | 8/1991 |

(Continued)

OTHER PUBLICATIONS

Machine Translation of EP 0869412.*

(Continued)

*Primary Examiner* — Amy Cohen Johnson
*Assistant Examiner* — Matthew Powell
(74) *Attorney, Agent, or Firm* — Oblon, McClelland, Maier & Neustadt, L.L.P.

(57) ABSTRACT

A sealing device for a minute-repeater mechanism, comprising a striking work control bolt which can move in an aperture of a case between a rest position and a pulled-out position. The case includes a seat for receiving in sealed abutment, in the rest position of the bolt, a first sealing gasket mounted in a sealed manner on the bolt and moveable therewith, and which is at a distance from the seat when the bolt is in a pulled-out position for operating the striking work. The case includes a chamber, one wall of which comprises the aperture, which limits the travel of a second sliding sealing gasket in which the bolt slides in a sealed manner, and which is in sealed abutment on an inner surface of the chamber.

16 Claims, 1 Drawing Sheet

(56) References Cited

FOREIGN PATENT DOCUMENTS

| EP | 0 869 412 A2 | 10/1998 |
| EP | 1 739 509 A1 | 1/2007 |
| WO | WO 00/36473 A1 | 6/2000 |
| WO | WO 2006/037739 A2 | 4/2006 |

OTHER PUBLICATIONS

European Search Report issued Nov. 8, 2012 in European Patent Application No. 12164533.7 filed on Apr. 18, 2012 (with English Translation).

* cited by examiner

SEALING DEVICE FOR A
MINUTE-REPEATER

This application claims priority from European Patent Application No. 12164533.7 filed Apr. 18, 2012, the entire disclosure of which is incorporated herein by reference.

FIELD OF THE INVENTION

The invention concerns a sealing device for a minute-repeater mechanism for a timepiece, said device including a striking work control bolt which can move in a case between a rest position and at least one pulled-out position, said bolt being guided in at least one aperture in said case.

The invention also concerns a minute-repeater mechanism for a timepiece comprising at least one striking work control mechanism actuatable by pulling out, into a pulled-out position, a bolt comprised in a sealing device of this type.

The invention also concerns a timepiece including at least one minute-repeater mechanism of this type.

The invention concerns the field of timepieces with complications controlled by control stems or levers external to the middle part of the timepiece. More specifically, it concerns the field of timepieces having a minute-repeater controlled by a bolt.

BACKGROUND OF THE INVENTION

Some timepiece mechanisms require a supply of energy in order to function, such as a barrel or a striking mechanism, which is generally provided, almost instantaneously, by operating a lever, or a bolt, or a stem, with a relatively large angular or linear travel relative to the volume of the timepiece.

This operating component necessarily includes a portion external to the middle part of the timepiece, which can be gripped by the user. This component acts on an internal mechanism, in a sealed area which is kept dry and protected from pollution by dust, sand or other elements. A contactless mechanism such as a magnetically controlled member is not generally suitable for the density of energy to be transmitted, and may also cause undesirable disruption to operation. It is therefore necessary to provide the timepiece with an efficient sealing means, at the border area between the internal part and the external part of the mechanism.

EP Patent No. 0 443 086 in the name of IWC discloses the conventional arrangement of a peripheral bolt with protection provided by sealing gasket.

Usually, this sealing is achieved by one or several gaskets arranged in series, as known from EP Patent No. 1 739 509 in the name of MONTRES BREGUET SA or from EP Patent No. 0 869 412 in the name of KELEK SA, wherein a bolt is pushed by the heel of a slide block into an external chamber where water can penetrate. This bolt is sealed and placed between the external chamber and an internal sealing chamber where the bolt pushes a lever inside the watch. A sealing means prevents water from entering the inner chamber. The bolt includes a push-piece with a sealing gasket and a return spring. The movement in translation of a stem of the push-piece ensures the transmission of motion.

These gaskets operate in shearing during sliding of a bolt stem. Even if there are several gaskets, they wear simultaneously. These gaskets, which are devised for sealing during the operation and push or pull motion of a bolt, are not specifically provided for protection in the closed rest position, which is the most frequent.

WO Patent No. 2006/037739 in the name of AFFOLTER GUYOT discloses a control device which comprises a bolt, moveable in translation at the periphery of the case, a plate pivoting in the case and kinematically connected to the bolt (particularly by a pin pushed by a beak of the bolt) and an arm hinged about a different arbour from that of the plate. This hinged arm has a first end pivoting on the plate on an off-centre arbour, and a second end secured to a part pivoting in the mechanism.

WO Patent No. 00/36473 in the name of BUENTER SANZ MULET discloses a control member with an external slide-block connected to an internal slide-block hinged to an actuating piston which passes through a sealed inner wall via a sealing device and which cooperates with a rack of the mechanism internal to the case.

SUMMARY OF THE INVENTION

The invention proposes to overcome the limitations of the prior art by proposing a simple and reliable external control mechanism which is sealed against moisture and dust, both when the mechanism is at rest and when it is operating.

The invention therefore concerns a sealing device for a timepiece minute-repeater mechanism, said device including a striking work control mechanism which can move in a case between a rest position and at least one pulled-out position, said bolt being guided in at least one aperture of said case, characterized in that said case includes a seat for receiving in sealed abutment, when said bolt is in said rest position, at least one static sealing gasket mounted in a sealed manner on said bolt and moveable therewith, and characterized in that said static sealing gasket is at a distance from said seat when said bolt is in said pulled-out position for manual operation of the striking work.

According to a feature of the invention, said bolt has an abutment surface which pushes said static sealing gasket and compresses it onto said seat when said bolt is in said rest position, under the action of an elastic return means comprised in said device which exerts stress on said bolt tending to return to bolt towards said rest position.

According to another feature of the invention, said case includes at least one chamber, one wall of which includes said aperture, said chamber limiting the travel of at least one sliding sealing gasket in which said bolt slides in a sealed manner and which is in sealed abutment on at least one inner surface of said chamber.

The invention further concerns a minuter-repeater mechanism for a timepiece comprising at least one striking work control mechanism actuatable by pulling, into a pulled-out position, a bolt comprised in a sealing device of this type, characterized in that it includes a means of receiving said case for securing or welding all or part thereof.

The invention further concerns a timepiece comprising at least one minute-repeater mechanism of this type, characterized in that it includes means of abutting and/or hinging a control lever for operating said bolt, and characterized in that it includes a middle part comprising a means of receiving said case for securing or welding all or part thereof.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
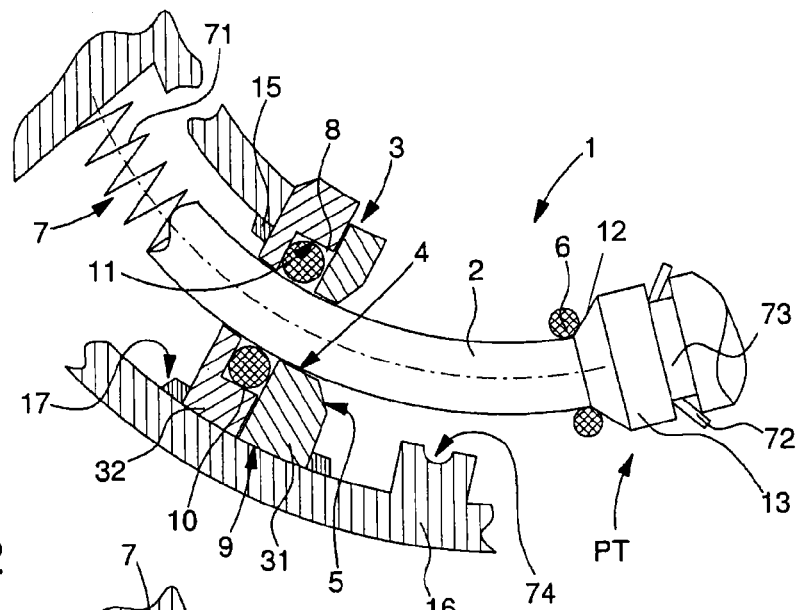
FIG. 1 shows a schematic cross-section of a sealing device for a minute-repeater mechanism according to the invention, in a plane passing through the median part of a bolt comprised therein, and in a pulled-out position of said bolt for operating the striking work.
Figure 2:
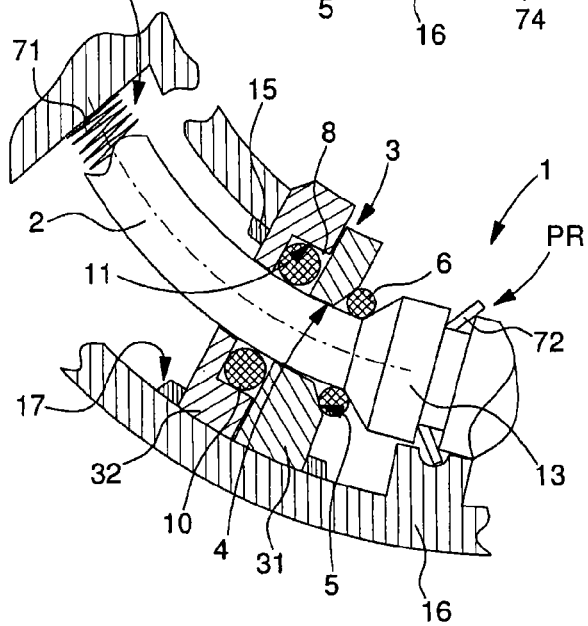
FIG. 2 shows the same mechanism in a rest position.
Figure 3:
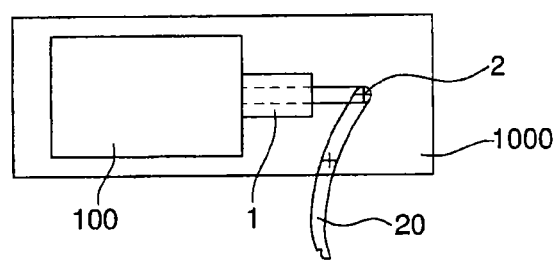
FIG. 3 is a block diagram of a timepiece with a minute-repeater mechanism and a sealing device according to the invention.

The invention concerns the field of timepieces with complications controlled by control stems or levers external to the middle part of the timepiece. More specifically, it concerns the field of timepieces having a minute-repeater controlled by a bolt.

The invention is described here for this one particular case of application, but it is easy for a watchmaker to transfer it to any other mechanism with a stem or lever moveable between a rest position and one or several actuating positions.

The invention concerns a sealing device 1 for a timepiece and in particular for a minute-repeater mechanism.

This device 1 includes a striking work control bolt 2 moveable in a case 3 between a rest position PR and at least one pulled-out position PT. Bolt 2 is preferably guided in at least one aperture 4 of case 3.

According to the invention, case 3 includes a seat 5 for receiving in sealed abutment, when bolt 2 is in rest position PR, at least one static sealing gasket 6, mounted in a sealed manner on bolt 2 and moveable therewith. This static sealing gasket 6 is removed from seat 5 when bolt 2 is in a pulled-out position PT for operating the striking work.

In a particular and preferred embodiment, static sealing gasket 6 is mounted in a sealed manner in a fixed position on bolt 2.

Preferably, bolt 2 has an abutment surface 12 which pushes the static sealing gasket 6 and compresses it onto seat 5 when bolt 2 is in rest position PR, under the action of an elastic return means 7 comprised in device 1, and which exerts stress on the bolt tending to return it towards rest position PR.

Advantageously, device 1 according to the invention combines this static sealing gasket 6, which is devised to protect the striking work control mechanism, and the entire contents of the timepiece, when bolt 2 is in rest position PR, with a sealing gasket which provides protection when bolt 2 is moving. Thus, case 3 has at least one chamber 8 and preferably one wall 9 of said chamber 8 includes aperture 4. Chamber 8 limits the travel of a sliding sealing gasket 10 in which bolt 2 slides in a sealed manner, and which is in sealed abutment on at least one inner surface 11 of chamber 8.

In a preferred but non-limiting version, as shown in the Figures, chamber 8 immobilises the sliding sealing gasket 10.

In a preferred embodiment of the invention, seat 5 is conical. It may have a different geometry, be a portion of a sphere, or have a particular curved profile providing the largest surface of contact between seat 5 and static sealing gasket 6 when the latter is compressed. Indeed, bolt 2 has an abutment surface 12 which pushes static sealing gasket 6 and compresses it onto seat 5 when bolt 2 is in the rest position PR, preferably under the action of an elastic return means 7, which is comprised in device 1 and which exerts stress on the bolt tending to return the bolt towards rest position PR.

In an advantageous embodiment, especially when seat 5 is conical, abutment surface 12 is conical.

In a particular embodiment illustrated in the Figures, bolt 2 comprises a head 13 carrying an abutment surface 12 of this type. In a first variant seen in the Figures, this head 13 comprises an elastic return means 7 which cooperates with a complementary abutment means 14 which is integral with case 3 or which forms part of the minute-repeater mechanism.

In another variant which is not illustrated, in a reverse configuration, head 13 includes a complementary abutment means 14 which cooperates with the elastic return means 7, which is integral with case 3 or which forms part of said minute-repeater mechanism.

Preferably, to complete the entire return travel of bolt 2 from the pulled-out position TR thereof furthest from position PR to said position PR, elastic return means 7 includes at least one helical spring 71, coaxial with bolt 2, for returning the latter to rest position PR.

When head 13 cooperates in the stress maintaining the rest position, preferably, as illustrated in the Figures, in addition to a helical spring 71 of this type, elastic return means 7 further includes at least one spring 72, elastically deformable in a substantially radial direction to bolt 2, for maintaining bolt 2 in rest position PR. This spring 72 is formed by a Belleville spring washer, or a tension washer, O-ring joint or similar, housed in a housing 73. Depending on the variant of head 13, this housing 73 either forms part of head 13 or case 3 or the minute-repeater mechanism. Spring 72 cooperates with a complementary housing 74 comprised respectively either in case 3 or the minute-repeater mechanism, on the one hand, or head 13 on the other hand.

Preferably, for maximum compactness, seat 5 is made on a sealing wall 31 comprised in a chamber 8 of case 3, one wall 9 of which includes aperture 4. Chamber 8, which confines the sliding sealing gasket 10, is advantageously formed by the sealed juxtaposition of a sealing wall 31 with a back wall 32 comprising a groove or housing as shown in the Figures, and gasket 10 can abut on one or several surfaces of sealing wall 31 and/or of the housing of back wall 32.

In a preferred embodiment, static sealing gasket 6 is an O-ring joint.

In a preferred embodiment, sliding sealing gasket 10 is also an O-ring joint.

The invention further concerns a minute-repeater mechanism 100 for a timepiece comprising at least one striking work control mechanism actuatable by pulling, into a pulled-out position PT, a bolt 2 comprised in a sealing device 1. According to the invention, this mechanism 100 includes a means 15 of receiving case 3 for securing or welding all or part thereof. Assembly by welding, adhesive bonding, brazing or similar is better, from the point of view of sealing, than a simple mechanical assembly.

The invention also concerns a timepiece 1000 including at least one such minute-repeater mechanism 100. According to the invention, it comprises a means of abutting and/or hinging a control lever 20 for operating bolt 2. It comprises a middle part 16 including a means 17 of receiving case 3 for the securing or welding, adhesive bonding, brazing or similar of all or part of said case.

Therefore, the invention provides a simple, economical and compact solution to the problem of sealing a control mechanism both at rest and in motion.

What is claimed is:

1. A sealing device for a minute-repeater mechanism for a timepiece, comprising:
   a striking work control bolt which can move in a case between a rest position and at least one pulled-out position, said bolt being guided in at least one aperture of said case and wherein said case includes a seat for receiving in sealed abutment, when said bolt is in said rest position, at least one first sealing gasket which is static with respect to the bolt and mounted in a sealed manner on said bolt and moveable therewith, and wherein said first sealing gasket is at a distance from said seat when said bolt is in said pulled-out position, for operating the striking work, wherein said bolt includes an abutment surface, which pushes said first sealing gasket, and compresses said first sealing gasket onto said seat when said bolt is in said rest position, under the action of an elastic return means comprised in said device which exerts stress on said bolt tending to return said bolt to the rest position thereof.

2. The sealing device according to claim 1, wherein said first sealing gasket is mounted in a sealed manner in a fixed position on said bolt.

3. The sealing device according to claim 1, wherein said case includes at least one chamber, one wall of which includes said aperture, said chamber limiting the travel of at least one second sealing gasket in which said bolt slides in a sealed manner and which is in sealed abutment on at least one inner surface of said chamber.

4. The sealing device according to claim 3, wherein said chamber immobilises said second sealing gasket.

5. The sealing device according to claim 3, wherein said second sealing gasket is an O-ring joint.

6. The sealing device according to claim 3, wherein said second sealing gasket does not slide with said bolt.

7. The sealing device according to claim 1, wherein said seat is conical.

8. The sealing device according to claim 7, wherein said abutment surface is conical.

9. The sealing device according to claim 1, wherein said bolt includes a head carrying said abutment surface, and wherein said head either includes an elastic return means which cooperates with a complementary abutting means integral with said case, or forms part of said minute-repeater mechanism, or includes a complementary abutting means which cooperates with an elastic return means integral with said case or which forms part of said minute-repeater mechanism.

10. The sealing device according to claim 9, wherein, to further maintain said bolt in said rest position, said elastic return means includes at least one spring, which is elastically deformable in a substantially radial direction to said bolt and is formed by a Belleville spring washer or a tension washer housed in a housing comprised either in said head on the one hand, or said case or said minute-repeater mechanism on the other hand, and cooperates with a complementary housing respectively comprised either in said case or said minute-repeater mechanism on the one hand, or on said head on the other hand.

11. The sealing device according to claim 1, wherein said elastic return means includes at least one helical spring coaxial with said bolt for returning said bolt to the rest position thereof.

12. The sealing device according to claim 1, wherein said seat is made on a sealing wall comprised in a chamber of said case, one wall of which comprises said aperture.

13. The sealing device according to claim 1, wherein said first sealing gasket is an O-ring joint.

14. A minute repeater mechanism for a timepiece; comprising:
at least one striking work control mechanism actuatable by pulling, into a pulled-out position, a bolt comprised in a sealing device according to claim 1,
wherein said mechanism includes a means of receiving said case for securing or welding all or part of said case.

15. A timepiece, comprising:
at least one minute-repeater mechanism according to claim 14, wherein it includes a means of abutting and/or hinging a control lever for operating said bolt, and wherein it includes a middle part comprising a means of receiving said case for securing or welding all or part of said case.

16. The sealing device according to claim 1, wherein said first sealing gasket is spaced apart from the case when said bolt is in the rest position.

\* \* \* \* \*